(12) United States Patent
Bichot et al.

(10) Patent No.: US 9,762,472 B2
(45) Date of Patent: Sep. 12, 2017

(54) METHOD FOR EVALUATING AN AVAILABLE PATH BITRATE BASED ON AN ACKNOWLEDGEMENT PATH SELECTION

(75) Inventors: Guillaume Bichot, Cesson Sevigne (FR); Stephane Gouache, Cesson Sevigne (FR); Amine Bsila, Villeurbanne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 273 days.

(21) Appl. No.: 13/642,344

(22) PCT Filed: Apr. 14, 2011

(86) PCT No.: PCT/EP2011/055934
§ 371 (c)(1),
(2), (4) Date: Jan. 7, 2013

(87) PCT Pub. No.: WO2011/131565
PCT Pub. Date: Oct. 27, 2011

(65) Prior Publication Data
US 2013/0201846 A1  Aug. 8, 2013

(30) Foreign Application Priority Data

Apr. 21, 2010 (EP) ..................................... 10305413

(51) Int. Cl.
H04L 12/26 (2006.01)
H04L 29/06 (2006.01)
H04L 12/707 (2013.01)

(52) U.S. Cl.
CPC ............ *H04L 43/50* (2013.01); *H04L 65/608* (2013.01); *H04L 65/80* (2013.01); *H04L 45/24* (2013.01); *H04L 69/14* (2013.01)

(58) Field of Classification Search
CPC .......... H04L 43/50; H04L 45/24; H04L 12/26
See application file for complete search history.

(56) References Cited

U.S. PATENT DOCUMENTS

| 6,751,209 B1 * | 6/2004 | Hamiti et al. ................ 370/349 |
| 7,987,284 B2 * | 7/2011 | Ogawa et al. ................ 709/233 |

(Continued)

FOREIGN PATENT DOCUMENTS

| CN | 1893707 | 1/2007 |
| CN | 101087244 | 12/2007 |
| JP | 2007043678 | 2/2007 |

OTHER PUBLICATIONS

Noonan et al. Apr. 23, 2006, Stall and Path Monitoring Issues in SCTP, Infocom 2006: 25th IEEE International Conference on Computer Communication. pp. 1-10.*

(Continued)

*Primary Examiner* — Lakeram Jangbahadur
(74) *Attorney, Agent, or Firm* — Tutunjian & Bitetto, P.C.

(57) ABSTRACT

A method for evaluating an available bitrate over a path among one of at least two paths linking a first endpoint and a second endpoint, the path being called an evaluation path, is disclosed. The first endpoint is configured for sending data packets to the second endpoint, the second endpoint is configured for sending at each data packet reception an acknowledgment message to the first endpoint through one of the at least two path selected at each data packet reception. The method comprises, at the first endpoint, steps of:
inserting a flag in a first data packet out of the data packets to be transmitted to the second endpoint through the evaluation path;
sending said first data packet through the evaluation path;
measuring and recording a sending time of the first data packet from said first endpoint;
receiving an acknowledgment message sent by the second endpoint through the evaluation path for acknowledging reception of the first data packet at said second endpoint;

(Continued)

measuring and recording an arrival time of said acknowledgment message at said first endpoint;

assessing the available bitrate from an interval between the sending time and the arrival time and from the size of said first data packet.

A method for sending at a second endpoint an acknowledgement message over a path among one of at least two paths linking a first endpoint and said second endpoint is further disclosed. Associated device for evaluating an available bitrate and device for sending at a second endpoint an acknowledgement message are disclosed.

14 Claims, 2 Drawing Sheets

(56) References Cited

U.S. PATENT DOCUMENTS

| | | | |
|---|---|---|---|
| 2002/0027884 A1* | 3/2002 | Halme | 370/253 |
| 2004/0243670 A1 | 12/2004 | Grimminger et al. | |
| 2005/0243978 A1* | 11/2005 | Son et al. | 379/88.13 |
| 2007/0002748 A1* | 1/2007 | Nakata et al. | 370/238 |
| 2007/0005787 A1 | 1/2007 | Igarashi et al. | |
| 2008/0298376 A1* | 12/2008 | Takeda et al. | 370/400 |
| 2009/0190482 A1* | 7/2009 | Blair | H04L 43/0858 370/250 |
| 2014/0219230 A1* | 8/2014 | Schierl et al. | 370/329 |

OTHER PUBLICATIONS

Sarkar, "A Concurent Multipath TCP and Its Markov Model", Communications, 2006, ICC '06, IEEE International Conference, Jun. 1, 2006, pp. 615-620.

Kim et al., "ECA-SCTP: Enhanced Cooperative ACK for SCTP Path Recovery in Concurrent Multiple Transfer", Proceedings of World Academy of Science, Engineering and Technology, Dec. 1, 2009.

Noonan et al., Stall and Path Monitoring Issues in SCTP, Infocom 2006: 25th IEEE International Conference on Computer Communications, Apr. 23, 2006.

Liu, Asymmetric-Path RTT Measurement and Optimization in Mobile Multi-homed SCTP Multimedia Transport, 2008 4th International Conference on Wirelss Communications, Networking and Mobile Computing (WICOM), Oct. 12, 2008, Dallan, China, pp. 1-4.

Search Report dated May 17, 2011.

Li et al., "Improving TCP Performance for Asymmetric Networks", Communications, 2001. ICC 2001. IEEE International Conference on, vol. 6, pp. 1824-1828.

Liu et al,. "Asymmetric Path Optimization in Mobile Multi-Homed SCTP Multimedia Transport", Proceedings of the 2008 International Conference on Intelligent Information Hiding and Multimedia Signal Processing, pp. 496-499.

Stewart, "Stream Control Transmission Protocol", Standards Track, Sep. 2007. (152 pages).

Anonymous, et al., SCTPLIB Analysis, Communication Protocol Laboratory Kyungpook National University, Jun. 2006, pp. 1-46.

* cited by examiner

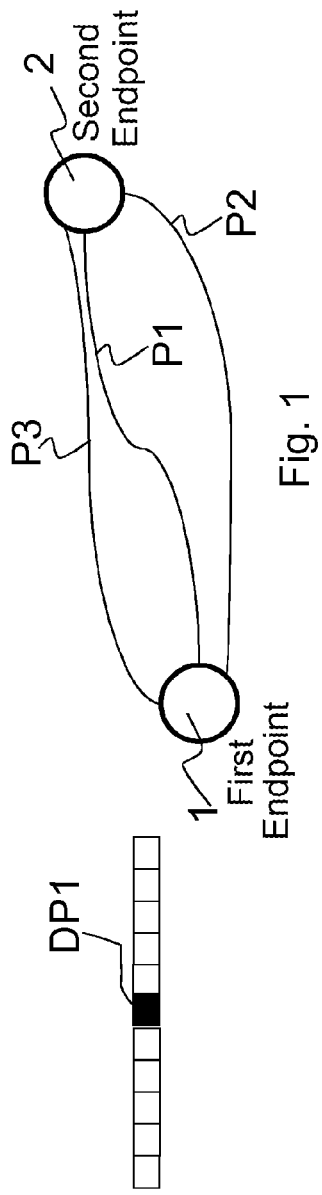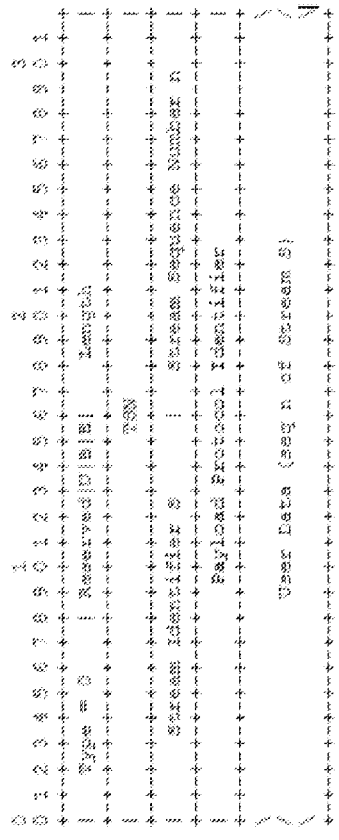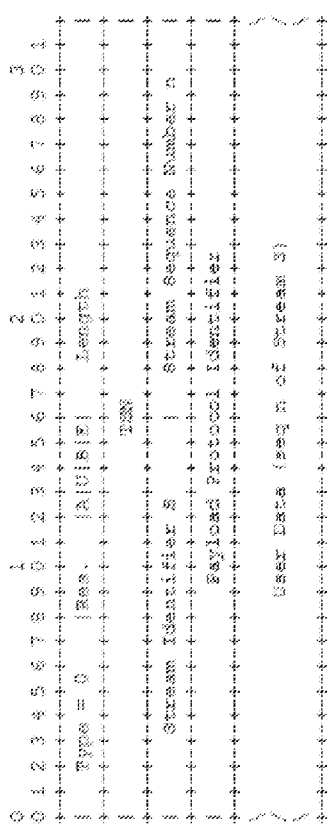

METHOD FOR EVALUATING AN
AVAILABLE PATH BITRATE BASED ON AN
ACKNOWLEDGEMENT PATH SELECTION

This application claims the benefit, under 35 U.S.C. §365 of International Application PCT/EP2011/055934, filed Apr. 14, 2011, which was published in accordance with PCT Article 21(2) on Oct. 27, 2011 in English and which claims the benefit of European patent application No. 10305413.6, filed Apr. 21, 2010.

FIELD OF THE INVENTION

The invention relates to the field of multi-path communication. More particularly the invention deals with a method for evaluating an available path bitrate based on an acknowledgment path selection.

BACKGROUND OF THE INVENTION

Multi-path communication inherits from the multi-homing capability that is about supporting several IP addresses (IP is an acronym for "Internet Protocol") to reach a given network endpoint. Problems and issues to address in multi-path technology are well known. For example, when using multiple paths to transmit information packets from a first endpoint to a second endpoint, the first endpoint must use a packet distribution strategy for balancing the data packets among the available paths linking the first and second paths. The aim of such a strategy is to select paths depending on the application (type of data) running in such endpoints and on the paths characteristic/status. The latter must be consistent with the real network state and is therefore maintained up to date through continuous measurements Depending on the application and at least for video delivery, the following parameters are commonly used to characterize a path: bandwidth, jitter, delay. These parameters can be measured through an end-to-end measurement method. This may not be trivial as the measurement process must not perturbate the data transfer. Hereinafter, the bandwidth which is a parameter describing the ability of a path to deliver an amount of data during a time duration is the main interest and later the expression "bitrate" will be preferably used rather than the expression "bandwidth" which are considered as equivalent.

For measuring such parameters an end-to-end transport protocol like for example Stream Control Transmission Protocol (SCTP) or TCP may measure the available bitrate from a Round-trip-time (RTT) measurement, which is considered as being equal to a difference between the time of sending of a data packet by the first endpoint to the second endpoint and the arrival time of an acknowledgment packet sent by the second endpoint to the first endpoint, said acknowledgment being sent by the second endpoint immediately after it receives said data packet.

However one showed that the strategies for sending acknowledgment of data packets can affect the overall transmission as, for example in SCTP, where sending the acknowledgement of data packet through the fastest available path speeds up the overall transmission. If such a strategy is used, one cannot guaranty the acknowledgment comes back through the same path than the data packet itself. Then, using the acknowledgment of data for evaluating the Round-trip-time wouldn't be pertinent.

The problem is then:how to measure frequently the available bitrate on a path without generating a high overload and in combination with a strategy of acknowledgment path selection used for managing the data delivery?

One of the goals of the present invention is to solve that problem.

SUMMARY OF THE INVENTION

The technical problem that present invention intends to solve is to measure an available bitrate over a path P1 linking a first endpoint and a second endpoint by forcing the second endpoint, at reception of a particular data packet sent from the first endpoint via path P1, to send back an acknowledgement through the same path P1. In such situation the data packet and the acknowledgment are both transmitted over the same path P1. This can be achieved through the usage of a dedicated signaling/flag located in the data packet which enable a particularization of a data packet.

Thus, the present invention concerns, according to a first aspect, a method for evaluating an available bitrate $BR1_1$ over a path P1 among one of at least two paths P1, P2, P3 linking a first endpoint 1 and a second endpoint 2, said path P1 being called an evaluation path, said first endpoint 1 being configured for sending data packets to said second endpoint 2, said second endpoint 2 being configured for sending at each data packet reception an acknowledgment message to said first endpoint 1 through one of the at least two path P1, P2, P3 selected at each data packet reception by said second endpoint 2.

According to an embodiment of the invention, it involves, at the first endpoint 1, steps of:
inserting a flag A in a first data packet DP1 out of said data packets to be transmitted to said second endpoint 2 through the evaluation path P1;
sending said first data packet DP1 through the evaluation path P1;
measuring and recording a sending time t1 of the first data packet DP1 from said first endpoint 1;
receiving an acknowledgment message Ack sent by said second endpoint 2 through said evaluation path P1 for acknowledging reception of said first data packet DP1 at said second endpoint 2;
measuring and recording an arrival time t2 of said acknowledgment message Ack at said first endpoint 1;
assessing the available bitrate $BR1_1$ from an interval between the sending time t1 and the arrival time t2 and from the size of said first data packet DP1.

According to a second aspect, the invention concerns a method for sending an acknowledgment message Ack over a path P1 among one of at least two paths P1, P2, P3 linking a first endpoint 1 and a second endpoint 2, said first endpoint 1 sending data packets to said second endpoint 2, at each data packet reception said second endpoint 2 sending an acknowledgment message to said first endpoint 1 through one of the paths P1, P2, P3 selected by said second endpoint 2 at each data packet reception.

According to an embodiment of the invention, it involves, at the second endpoint 2, steps of:
Receiving a data packet sent by said first endpoint 1 through one path P1 among the paths P1, P2, P3;
Detecting whether said data packet comprises a flag A and determining through which path P1 said second endpoint 2 received said data packet;
Sending an acknowledgment message Ack to said first endpoint 1 for acknowledging the reception of said data packet at said second endpoint 2 through said path P1 when a flag A is detected in said data packet.

According to a third aspect, the invention concerns a device for evaluating an available bitrate $BR1_1$ over a path P1 among one of at least two paths P1, P2, P3 linking the first endpoint 1 and a second endpoint 2, said path being called an evaluation path, said first endpoint 1 sending data packets to said second endpoint 2, said second endpoint 2 sending at each data packet reception an acknowledgment message to said first endpoint 1 through one of the path P1, P2, P3 selected at each data packet reception for said data packet.

According to an embodiment of the invention, it comprises:

Means for inserting a flag A in a first data packet DP1 before said data packet is sent to said second endpoint 2 through the evaluation path P1;

Means for measuring and recording a sending time t1 of said first data packet DP1 from said first endpoint 1;

Means for receiving an acknowledgment message Ack sent by said second endpoint 2 through said evaluation path P1 for acknowledging reception of said first data packet DP1 at said second endpoint 2;

Means for measuring and recording an arrival time t2 at the first endpoint 1 of said acknowledgment message Ack;

Means for assessing the available bitrate $BR1_1$ from an interval between the sending time t1 and the arrival time t2 and from the size of said first data packet DP1.

According to a fourth aspect, the invention concerns a device for sending an acknowledgment message Ack over a path P1 among one of at least two paths P1, P2, P3 linking a first endpoint 1 and said second endpoint 2, said first endpoint 1 sending data packets to said second endpoint 2, said second endpoint 2 sending at each data packet reception an acknowledgment message to said first endpoint 1 through one of the acknowledgment path P1, P2, P3 selected at each data packet reception for said data packet.

According to the invention, it comprises:

Means for receiving a data packet sent by said first endpoint 1 through any of the paths P1, P2, P3;

Means for detecting whether said data packet comprises a flag A and for determining through which path P said second endpoint 2 received said data packet;

Means for sending through said path P1 an acknowledgment message Ack to said first endpoint 1 for acknowledging the reception of said data packet at said second endpoint 2 when a flag A is detected in said data packet.

According to an embodiment, said flag insertion has no effect on size of said first data packet DP1.

All data packets comprise a header.

According to an embodiment, the flag A is inserted in a reserved bit of the header of the first or second data packet DP1, DP2.

According to an embodiment, a transport protocol is used for transporting data packets from the first endpoint 1 to the second endpoint 2 through said paths P1, P2, P3.

According to an embodiment, said transport protocol is SCTP.

According to an embodiment, said flag A is located in one reserved bit of the header of said first data packet DP1.

A first advantage of the invention is that it allows making available at sending side a measure of the available path bitrate from a single flag inserted in a data packet: This single flag generates no extra load. This is particularly advantageous in case of evaluation available bitrate realized at high frequency.

A second advantage of the invention is that it relies on a mechanism of acknowledgment carried out for data transfer. Even the data acknowledgment mechanism is used for improving the overall transmission it can be briefly modified for contributing to an evaluation of the available bitrate without inducing negative noticeable effect on the overall transmission.

A third advantage resides in the smart goodput measure it allows as soon as more than one throughput measure is performed.

BRIEF DESCRIPTION OF THE DRAWINGS

The invention will be better understood and illustrated by means of the following embodiments and execution examples, in no way limitative, with reference to the appended figures on which:

FIG. 1, represents a first and a second endpoint linked by paths P1, P2, P3;

FIG. 2a, shows the details of a typical SCTP data packet (or data chunk);

FIG. 2b, shows the details of an adapted SCTP data packet for carrying out a method according to the invention.

DETAILED DESCRIPTION OF PREFERRED EMBODIMENTS

Figure 3:
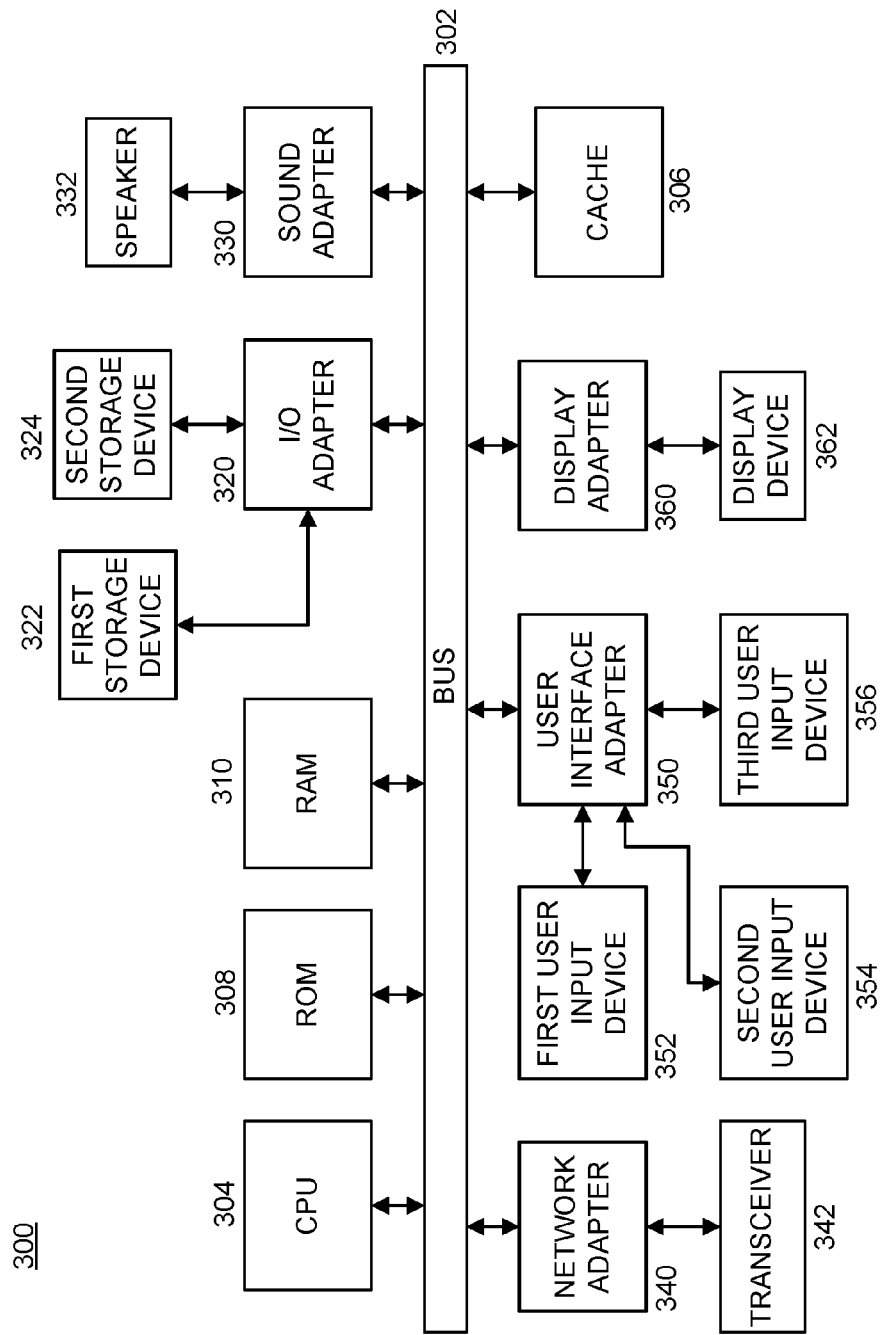
FIG. 3 is a block diagram illustratively depicting an exemplary processing system to which the present principles may be applied, in accordance with an embodiment of the present principles.

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

FIG. 1 shows a first endpoint 1 and a second endpoint 2 linked by three paths P1, P2, and P3.

A transport protocol is used for transporting data from the first endpoint 1 to the second endpoint 2 by said path P1, P2 and P3.

One wishes to measure the available bitrate on the path P1 in a situation where path P1 is currently used for sending data from first endpoint 1 to the second endpoint 2.

Let's consider an amount of data D split and transferred in a form of data packets to be sent from the first endpoint 1 to the second endpoint 2 over the path P1.

The first endpoint 1 sends successively the data packets over the path P1. At reception of each data packet, the second endpoint 2 sends classically an acknowledgment to the first endpoint 1. This acknowledgment is sent over one of the available paths P1, P2, P3 and not mandatorily over the path P1 used for transporting the corresponding data packet. The selection of the path P1, P2, P3 for transporting the acknowledgment is performed for achieving a goal such as speeding up the overall transmission of data packets from the first endpoint 1 to the second endpoint 2. An example of a strategy used to achieve this goal will be briefly described below. In particular, said data acknowledgments are not always sent through the same path P1 and particularly are not always sent through the same path P1 than the corresponding data packets they acknowledge. In a situation where an acknowledgment is not necessarily transported on the same path than the corresponding data packet, said acknowledgment cannot be used for evaluating the round-trip-time.

The strategy followed by the second endpoint 2 for selecting an path for transporting said data acknowledgment is determined in relation to the pursued objective. For example, when the objective is to optimize the overall speed of the data packet transport, a suitable strategy would be to send the acknowledgment for the second endpoint 2 always over the fastest path at the time of reception of the data packet. Due to congestion problem or any other event, this fastest path can be P1, P2 or P3 depending on time.

The idea is to force briefly the second endpoint to interrupt the predefined strategy for certain (particular) data packets. Then, the first endpoint 1 comprises a device adapted for particularizing a data packet DP1 for example by inserting a flag A in said data packet DP1 before it is sent from first endpoint 1.

When, the second endpoint detects it receives such a singular first data packet DP1 transported via said path P1, it sends in response a corresponding acknowledgment which is mandatorily sent over the same path P1 to the first endpoint. For this particular data packet, the second endpoint does not follow the strategy concerning the selection of a path for transporting said data acknowledgment out of the available paths.

Advantageously, the flag insertion does not modify the overhead of said data packets. The overhead is the ratio between the size of data comprised in a data packet and the whole size of the packet. In particular, the insertion of a flag A doesn't modify the size of the data packet.

A representation of information successively sent over the path P1 is shown on the top of FIG. 1 where a dark box shows a first data packet DP1 in which a flag is inserted. The other white boxes represent data packets which don't comprise any flag inserted by the first endpoint. These later data packets will be named later "normal data packet".

Following the reception by the second endpoint 2 of one normal data packet, said second endpoint sends, in response, an acknowledgment to the first endpoint 1 through one of the available path P1, P2 or P3 depending on the predefined strategy.

Following the reception by the second endpoint 2 of a first data packet DP1 (particular data packet), said second endpoint sends in response an acknowledgment Ack to the first endpoint through the same path P1 than the one over which the data packet was sent to the second endpoint.

The second endpoint 2 determines whether a received data packet is a normal data packet or a particular data packet by examining the presence of a flag set to 1 inserted in the data packet.

The first endpoint 1 comprises means for evaluating a date of sending t1 of this first data packet DP1 from said first endpoint, means for storing said date of sending t1 of this first data packet DP1 and also means for evaluating a date of reception t2 of this particular acknowledgment by said first endpoint and means for evaluates the available bitrate BR from an interval between the sending time t1 and the arrival time t2 and the size of the first data packet DP1.

Then, at the first endpoint 1, one evaluates the available bitrate BR from an interval between the sending time t1 and the arrival time t2 by assuming for example a transport duration for the acknowledgment equal to zero.

When the protocol used for transporting data packets from the first endpoint 1 to the second endpoint 2 is SCTP, one learns from the paragraph 3.3.1 of the technical document "RFC 4960—Stream Control Transmission Protocol" which can be found on the internet at the following address "http://tools.ietf.org/html/rfc4960" what is the payload structure of a SCTP data chunk (or SCTP data packet).

This Payload structure is represented in FIG. 2a. It shows in particular the presence of 5 bits which are reserved, by default set to zero and usually ignored at reception of the data packet.

In this particular embodiment, the invention proposes to use at least one of these reserved bit. FIG. 2b shows an exemplary embodiment of a modification of SCTP data packet structure for considering one of the 5 reserved bits as a flag A. This flag can be set to 1 by the first endpoint.

When a data packet having such a flag A set to 1 is received by the second endpoint 2, said second endpoints stops operating the strategy for selecting a path for conveying the acknowledgment of receipt to the first endpoint 1 and mandatorily sends the acknowledgment Ack through the same path P1 it received the first data packet DP1.

Advantageously, the insertion of the flag consists in setting to 1 a reserved bit in a header of data packet.

When a first data packets DP1 and a second data packets DP2, are sent successively, from the first endpoint 1 to the second endpoint 2 and when the first and the second packet DP1 DP2 have two different sizes, one gets successive transportation duration (t2−t1) measurements corresponding to two different amount of data. From linear regression calculations of the packet size versus said transportation durations (t21−t1) one achieves a packet preparation duration and a speed per unitary packet size over the evaluation path P1.

According to an embodiment, when a second evaluation of an available bitrate $BR1_2$ is realized on said evaluation path P1 by using a second data packet DP2 having a size different from the size of the first packet DP1, it involves a further step of assessing a packet preparation duration and a delivery speed per unitary packet size over the evaluation path P1.

Referring now to FIG. 3, an exemplary processing system 300 to which the present principles may be applied is depicted in accordance with an embodiment of the present principles. The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

Further, it is to be appreciated that processing system 300 may perform at least part of the methods described herein including, for example, at least part of the method of FIG. 2b.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

The invention claimed is:

1. A method for evaluating at a first endpoint an available bitrate over an evaluation path among at least two paths linking the first endpoint and a second endpoint, said method comprising:
sending data packets by said first endpoint to said second endpoint;
receiving by said first endpoint an acknowledgment message for each sent data packet from said second endpoint via one of the at least two paths selected for each sent data packet according to a path acknowledgement strategy determined by said second endpoint;
setting a single reserve bit in a first data packet out of said data packets to be transmitted to said second endpoint through the evaluation path;
sending said first data packet through the evaluation path;
measuring and recording a sending time of the first data packet from said first endpoint;
receiving said acknowledgment message from said second endpoint via said evaluation path for acknowledging reception of said first data packet at said second endpoint, interrupting said path acknowledgement strategy when said single reserve bit is set in said first data packet and receiving said acknowledgement message from said second endpoint via a path among the at least two paths according to said path acknowledgement strategy for acknowledging reception of said first data packet at said second endpoint when said single reserve bit is not set in said first data packet;
measuring and recording an arrival time of said acknowledgment message received through said evaluation path at said first endpoint, when said single reserve bit is set in said first data packet; and
obtaining the available bitrate from an interval between the sending time and the arrival time and from the size of said first data packet.

2. The method according to claim 1, wherein when a second evaluation of an available bitrate is realized on said evaluation path by using a second data packet having a size different from the size of the first packet, the method further comprises assessing a packet preparation duration and a delivery speed per unitary packet size over the evaluation path.

3. The method according to claim 1, wherein said single reserve bit insertion has no effect on size of said first data packet.

4. The method according to claim 1, said data packets comprising a header, wherein the single reserve bit is inserted in a reserved bit of the header of the first or second data packet.

5. The method according to claim 1, wherein a transport protocol is used for transporting data packets from the first endpoint to the second endpoint through said at least two paths.

6. The method according to claim 5, wherein said transport protocol is SCTP.

7. A method, comprising:
sending at a second endpoint an acknowledgment message over an evaluation path among one of at least two paths linking a first endpoint and said second endpoint, said second endpoint receiving data packets from said first endpoint, said second endpoint sending at each data packet reception said acknowledgment message to said first endpoint through one of the at least two paths selected at each data packet reception for said data packet according to a path acknowledgement strategy determined by said second endpoint, wherein the method further comprises:
receiving a data packet from said first endpoint via any of the paths;
sending said acknowledgment message to said first endpoint for acknowledging the reception of said data packet at said second endpoint through a same path as the same path where said data packet is received, interrupting said path acknowledgement strategy when said received data packet comprises a single reserve bit set; and
sending said acknowledgement message to said first endpoint for acknowledging the reception of said data packet at said second endpoint through a path, among the at least two paths, according to said path acknowledgement strategy when said received data packet comprises said single reserve bit not set.

8. A device for evaluating an available bitrate over an evaluation path among one of at least two paths linking a first endpoint and a second endpoint, said device comprising:
a processor;
a memory;
wherein the processor is coupled to the memory, the processor being configured to:
send data packets from said first endpoint to said second endpoint, receive an acknowledgment message for each sent data packet from said second endpoint via one of the at the least two paths selected for each sent data packet according to a path acknowledgement strategy determined by said second endpoint;
set a single reserve bit in a first data packet before said data packet is sent to said second endpoint through the evaluation path;

measure and record a sending time of said first data packet from said first endpoint;

receive said acknowledgment message from said second endpoint via said evaluation path for acknowledging reception of said first data packet at said second endpoint, interrupting said path acknowledgement strategy when said single reserve bit is set in said first data packet and receive said acknowledgment message from said second endpoint through a path among the at least two paths according to said path acknowledgement strategy for acknowledging reception of said first data packet at said second endpoint when said single reserve bit is not set in said first data packet;

measure and record an arrival time at the first endpoint of said acknowledgment message, received through said evaluation path, when said single reserve bit is set in said first data packet; and obtain the available bitrate from an interval between the sending time and the arrival time and from the size of said first data packet.

9. The device according to the claim 8, wherein said processor is further configured to assess a packet preparation duration and a delivery speed per unitary packet size over the evaluation path from results of two successive evaluations of the available bitrate over a path.

10. The device according to the claim 8, wherein said first endpoint uses SCTP as a transport protocol for sending data packets from first endpoint to said second endpoint.

11. The device according to the claim 8, wherein said single reserve bit is located in one reserved bit of the header of said first data packet.

12. The device according to claim 8, wherein said device is located in said first endpoint.

13. A device, comprising:
a processor;
a memory;
wherein the processor is coupled to the memory, the processor being configured to:
send an acknowledgment message over an evaluation path among at least two paths linking a first endpoint and a second endpoint, said second endpoint receiving data packets from said first endpoint, said second endpoint sending at each data packet reception said acknowledgment message to said first endpoint through one of the at least two paths selected at each data packet reception for said data packet according to a path acknowledgement strategy determined by said second endpoint;

receive a data packet from said first endpoint via any of the at least two paths;

send said acknowledgment message to said first endpoint for acknowledging the reception of said data packet at said second endpoint through a same path as the same path where said data packet is received, interrupting said path acknowledgement strategy when said received data packet comprises a single reserve bit set; and send said acknowledgement message to said first endpoint for acknowledging the reception of said data packet at said second endpoint through a path, among the at least two paths, according to said path acknowledgement strategy when said received data packet comprises said single reserve bit not set.

14. The device according to claim 13, wherein said device is located in said second endpoint.

* * * * *